United States Patent Office.

BENJAMIN ELI RATCLIFFE, OF NEW YORK, N. Y.

COMPOSITION OF MATTER FOR FACING BROWN STONE AND FOR MAKING ARTIFICIAL STONE.

SPECIFICATION forming part of Letters Patent No. 321,137, dated June 30, 1885.

Application filed May 29, 1885. (No specimens.)

*To all whom it may concern:*

Be it known that I, BENJAMIN E. RATCLIFFE, a citizen of the United States, residing at New York city, in the county and State of New York, have invented a new and useful Composition of Matter for Facing Brown Stone and for Making Artificial Stone, of which the following is a specification.

My composition consists of the following ingredients combined in the proportions stated, viz: Oil, linseed preferred, twenty-eight pounds; sand, sixty-eight pounds; litharge, four pounds. These ingredients are to be thoroughly mixed and pigments or other coloring material added, if desired, to give the mixture any desired tint or color. If a mixture of fine grain is desired, a small quantity of ground pumice-stone, say, three pounds to the quantities named, may be added.

The composition may be molded to form blocks of stone, or it may be applied to the surface of natural stone to preserve it, in which case it will be spread with a trowel in a thin layer upon the stone to be preserved.

The composition will adhere to the stone to which it may be applied, and will form a surface resembling the stone itself, and the oil the composition contains renders it impervious to water and prevents the decay of the stone to which the composition is applied.

Having thus described my invention, I claim as new and desire to secure by Letters Patent—

The herein-described composition of matter composed of oil, sand, and litharge in about the proportions specified.

BENJAMIN ELI RATCLIFFE.

Witnesses:
    H. A. WEST,
    C. SEDGWICK.